United States Patent
Chin et al.

(10) Patent No.: US 10,116,161 B2
(45) Date of Patent: Oct. 30, 2018

(54) LINE RIPPLE COMPENSATION FOR SWITCHING POWER CONVERTERS

(71) Applicant: DIALOG SEMICONDUCTOR INC., Campbell, CA (US)

(72) Inventors: Kai-Wen Chin, Campbell, CA (US); Fuqiang Shi, Campbell, CA (US); Pengju Kong, Campbell, CA (US); David Nguyen, Campbell, CA (US)

(73) Assignee: DIALOG SEMICONDUCTOR INC., Campbell, CA (US)

( * ) Notice: Subject to any disclaimer, the term of this patent is extended or adjusted under 35 U.S.C. 154(b) by 78 days.

(21) Appl. No.: 15/406,534

(22) Filed: Jan. 13, 2017

(65) Prior Publication Data
US 2018/0205254 A1   Jul. 19, 2018

(51) Int. Cl.
| H02M 1/14 | (2006.01) |
| H02M 3/335 | (2006.01) |
| H02J 7/00 | (2006.01) |
| H02M 1/08 | (2006.01) |
| H02M 1/00 | (2006.01) |

(52) U.S. Cl.
CPC .............. *H02J 7/0093* (2013.01); *H02M 1/08* (2013.01); *H02M 1/14* (2013.01); *H02M 3/33523* (2013.01); *H02J 2007/0095* (2013.01); *H02M 2001/0025* (2013.01)

(58) Field of Classification Search
CPC .......... H02M 1/14; H02M 1/143; H02M 1/15; H02M 3/335; H02M 3/33523
See application file for complete search history.

(56) References Cited

U.S. PATENT DOCUMENTS

| 9,735,670 | B2 * | 8/2017 | Wu ..................... H02M 1/4225 |
| 9,912,247 | B2 * | 3/2018 | Chung .................. H02M 5/458 |
| 2015/0311778 | A1 * | 10/2015 | Chang .................. H02M 1/143 363/21.16 |
| 2016/0261198 | A1 * | 9/2016 | Li .......................... H02M 1/15 |

\* cited by examiner

*Primary Examiner* — Gary L Laxton
(74) *Attorney, Agent, or Firm* — Haynes and Boone, LLP

(57) ABSTRACT

A line ripple compensation technique is provided for a switching power converter operating in both a pulse frequency mode of operation and a pulse width modulation mode of operation.

18 Claims, 4 Drawing Sheets

LINE RIPPLE COMPENSATION FOR SWITCHING POWER CONVERTERS

TECHNICAL FIELD

This application generally relates to switching power converters and, more particularly, to line ripple compensation for switching power converters.

BACKGROUND

Switching power converters include a controller that controls the cycling of a power switch to regulate the delivery of power to a load. During a constant voltage control mode of operation, the controller controls the power switch cycling responsive to a feedback voltage signal derived from the output voltage delivered to a load. In a digital feedback loop, the feedback voltage signal is processed by a voltage sensing circuit including a comparator that drives a binary output signal responsive to whether the feedback signal is greater than or less than a reference voltage signal produced by a digital-to-analog converter (DAC). In an analog feedback loop, an error amplifier generates an error voltage responsive to the difference between the feedback voltage signal and the reference voltage signal.

Regardless of whether the controller has a digital or analog feedback loop, the controller determines a desired peak current for the current cycle of the power switch based upon the processing of the feedback voltage through the feedback loop. In particular, the controller monitors a sense voltage across a sense resistor in series with the power switch to determine whether the sense voltage indicates that the desired peak current has been obtained by comparing the sense voltage to a peak voltage that is proportional to the desired peak current. Once the controller determines that the sense voltage has reached the peak voltage, the controller switches off the power switch in the current power switch cycle.

The regulation of the output voltage through the cycling of the power switch according to each cycle's peak voltage determination is affected by the line voltage for the AC mains for providing the input power to the switching power converter. In particular, it is conventional for a controller to have to regulate the output voltage over a range of AC mains voltages. The particular AC line voltage depends upon country standards but is generally contained within a universal input range that covers roughly 90 VAC to 270 VAC. The AC line voltage is rectified through a diode bridge to produce a rectified input voltage having a magnitude that depends on the particular AC line voltage selected by the power utility. The rectified input voltage is smoothed through a bulk input capacitor but it is advantageous for the bulk input capacitor to be relatively small to keep manufacturing costs low, minimize harmonic distortion, and to lower the area demands on the printed circuit board on which the bulk input capacitor is mounted.

Given the small size of the bulk input capacitor, the rectified input voltage will have a sinusoidal profile that reaches a minimum value at each zero crossing for the AC line voltage. A rectified input voltage 100 is shown in FIG. 1A for a relatively high AC line voltage within the universal input range. Conversely, a rectified input voltage 105 results from a relatively low AC line voltage. The minimum voltage values for rectified input voltage 105 result in a low frequency line ripple in an output voltage 110 as shown in FIG. 1B while the switching power converter is subjected to a relatively heavy load while operating in a pulse width modulation mode of operation. Such low frequency line ripple will be present even for a relatively high AC line voltage during brown-out conditions.

Since such low frequency line ripple in the output voltage is undesirable, it is conventional for a controller to implement line ripple compensation in which the peak voltage for each power switch cycle is adjusted. In particular, the peak voltage depends not only upon the processing of the feedback voltage through the controller's feedback loop but also upon the switching period. Although the switching period is ideally constant during high-load pulse-width-modulation (PWM) of the power switch cycling, the actual switching period used in each switching cycle may deviate from the desired switching period value. For example, the desired switching period may expire but the secondary current in the secondary winding of the transformer (or the inductor current in a non-isolated switching power converter) has not yet reduced to zero. The controller must then wait until zero conduction current is achieved before the power switch may be cycled on (in a critical discontinuous conduction mode). Similarly, the reflected voltage on the primary winding will oscillate after the secondary current has reached zero. This reflected voltage may oscillate to values during a discontinuous conduction mode that would harm the power switch if it were cycled on at such a time. It is thus conventional to switch on the power switch during valleys in the reflected voltage oscillations in a technique known as valley-mode switching. Both valley-mode switching and critical discontinuous conduction mode operation may thus result in a difference between the desired switching period and the actual switching period used in a given cycle of the power switch.

Controllers with line ripple compensation monitor the difference between the desired switching period and the actual switching period in a preceding cycle of the power switch to adjust the peak voltage for a current cycle of the power switch. But such conventional line ripple compensation is only performed during heavy-load PWM operation of the power switch. However, heavy load conditions are no longer restricted to PWM modes of operation in modern switching power converters due to the development of direct charge techniques in which the switching power converter must directly charge a battery as opposed to providing a regulated DC output voltage that is then converted through a non-isolated switching power converter (e.g., a buck converter) within a mobile device to the proper voltage and current for charging the battery. Direct charging is advantageous because the mobile device no longer needs the non-isolated switching power converter for the charging of its battery, which lowers manufacturing costs. But direct charging involves the usage of pulse frequency modulation (PFM) of the power switch cycling at relatively heavy loads such that line ripple compensation is desirable. But conventional line ripple compensation is not applicable during PFM operation.

Accordingly, there is a need in the art for controllers for switching power converters with improved line ripple compensation that is applicable to both PWM and PFM modes of operation.

SUMMARY

To provide improved line ripple compensation and to extend its application beyond pulse width modulation operation to include pulse frequency modulation operation, a controller is provided that uses not only the difference between the actual switching period and the desired switching period but also the desired peak voltage to determine a peak voltage adjustment factor for the desired peak voltage. For example, the peak voltage adjustment factor may be proportional to a product of the difference between the actual switching period and the desired switching period with a ratio of the desired peak voltage to the desired switching period. The addition of the desired peak voltage and the resulting peak voltage adjustment factor provides a compensated peak voltage for the current switching period that provides the appropriate amount of output power to maintain a constant voltage despite the application of a heavy load during low AC line voltage conditions.

In a pulse frequency mode of operation, a control loop within the controller adjusts a desired switching period responsive to a feedback voltage from a load. As the load is increased, the controller decreases the desired switching period so that the pulse frequency is increased to provide increased power to the load. Conversely, as the load is decreased, the controller increases the desired switching period so that the pulse frequency is reduced to reduce the amount of power delivered to the load. Such adjustment of the desired switching period during pulse frequency modulation operation conventionally uses a static peak voltage. This static peak voltage is made dynamic through the line ripple compensation disclosed herein to prevent or inhibit line ripple during pulse frequency modulation operation in the presence of a relatively heavy load.

These and additional advantageous features may be better appreciated through a consideration of the following detailed description.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

During conventional PFM operation, the switching power controller adjusts the switching period to regulate the power delivered to a load. Each pulse (on-time) of the power switch is controlled by switching off the power switch in each cycle in response to a sense resistor voltage equaling a desired peak voltage. The desired peak voltage is static, it is the pulse width that is dynamic in pulse frequency modulation. This static peak voltage is made dynamic in the controller disclosed herein to provide an advantageous line ripple compensation during pulse frequency modulation as explained further herein. The resulting line ripple compensation technique is also applicable for pulse width modulation operation as well. To provide this improved line ripple compensation, the relationship between the output power and the peak voltage (V_Ipk) is exploited as follows. In particular, it can be shown that the output power (P) for a switching power converter operating in constant voltage mode (for either PFM or PWM operation) is $$P = (\tfrac{1}{2}) \ast Lm(V\_Ipk/Rs)^2/T\_\mathrm{Period}(CV) \qquad \mathrm{Eq\ (1)}$$

where Lm is the magnetizing inductance of the primary winding (in a flyback converter) or of the inductor (in a non-isolated switching power converter), Rs is the resistance of the sense resistor, and T_Period(CV) is the desired switching period. Note that T_Period(CV) will be dynamic in a pulse frequency mode of operation whereas it will be static in a pulse width modulation mode of operation. From equation (1), the desired peak voltage V_Ipk(CV) becomes:

$$V\_Ipk(CV) = (2 \ast T\_\mathrm{Period}(CV) \ast P \ast Rs^2/Lm)^{1/2} \qquad \mathrm{Eq\ (2)}$$

which may be rephrased as:

$$V\_Ipk(CV) = (2 \ast P \ast Rs^2/Lm)^{1/2} \ast T\_\mathrm{Period}(CV)^{1/2} \qquad \mathrm{Eq.\ (3)}$$

To determine what V_Ipk(CV) should be in a current cycle of the power switch based upon a change (ΔTp) between the actual switching period (T_Period(measured)) in a preceding cycle of the power switch and the desired switching period T_Period(CV), a partial derivative ∂Vipk/∂T_Period(CV) is taken of the right side equation (3). In particular, the partial derivative leads to an expression for the peak voltage change (ΔV_Ipk) in a current cycle of the power switch as a function of the change (ΔTp) for the period in a preceding cycle of the power switch:

$$\Delta V\_Ipk(CV) = (\tfrac{1}{2}) \ast (V\_Ipk(CV)/T\_\mathrm{Period}(CV)) \ast \Delta Tp \qquad \mathrm{Eq.\ (4)}$$

Since equation (4) is ultimately derived from equation (1), it may be seen that the resulting change in the peak voltage is the optimum amount to maintain a constant output voltage despite the difference in the actual switching period as compared to the desired switching period regardless of whether the controller is operating in a pulse width modulation mode of operation or in a pulse frequency modulation mode of operation.

Figure 2:
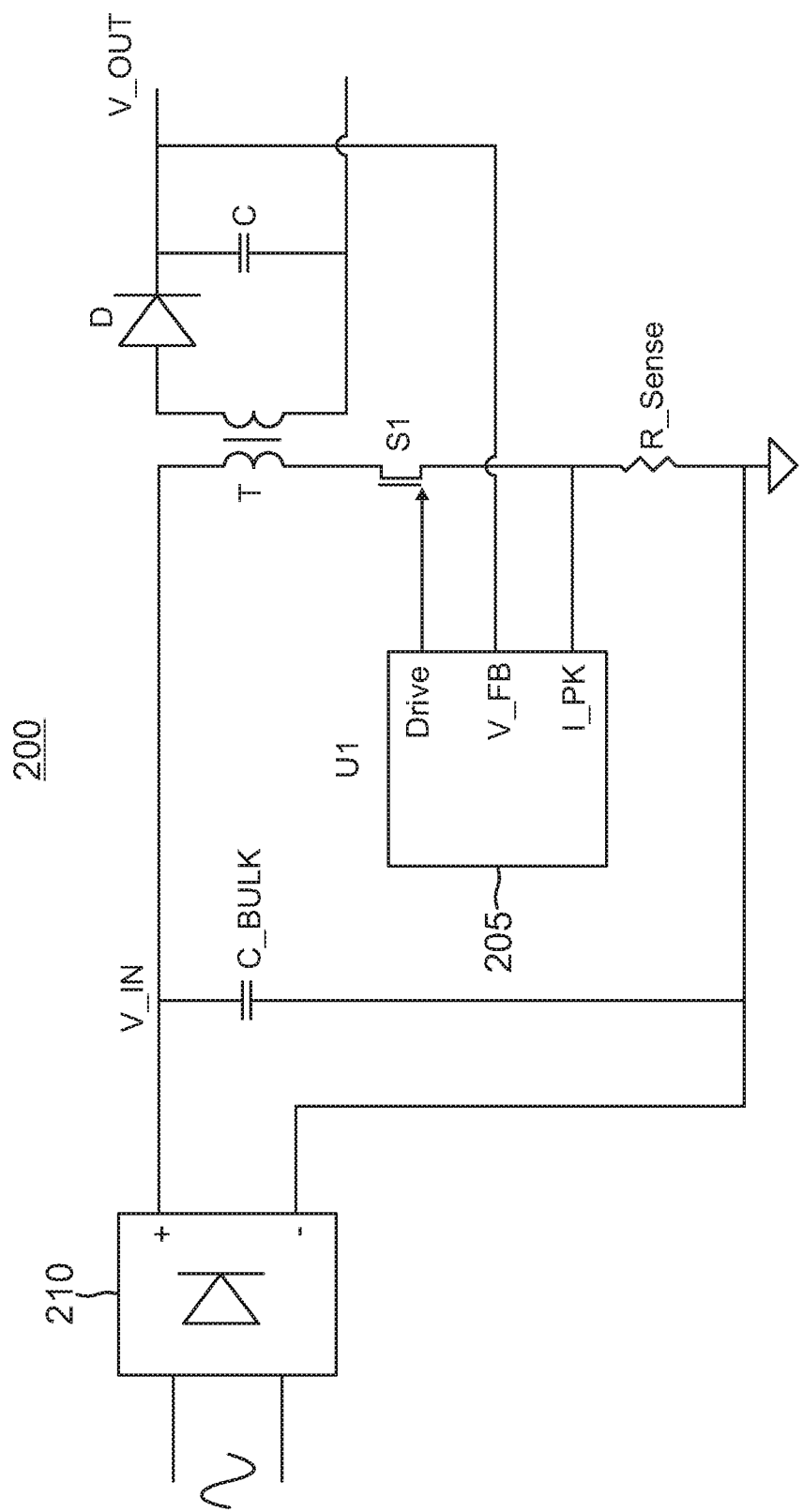
FIG. 2 is a diagram of a flyback converter including a controller configured to implement line ripple compensation in accordance with an aspect of the disclosure.

A controller is provided that utilizes equation (4) to more carefully compensate for line ripple during PWM modes of operation and also to extend line ripple compensation to PFM modes. An example flyback converter 200 with a controller 205 configured for the line ripple compensation technique disclosed herein is shown in FIG. 2. As known in the switching power converter arts, controller 205 is configured to calculate a desired peak voltage for a sense resistor R_Sense in each cycle of a power switch transistor S1 that couples to a primary winding of a transformer T based upon a feedback voltage derived from the output voltage (V_OUT) during pulse width modulation operation. The desired switching period is static in pulse width modulation operation. In contrast, controller 205 is configured to determine the desired switching period during pulse frequency modulation operation based upon the feedback voltage. The desired peak voltage is thus static during pulse frequency mode operation. The primary winding of transformer T receives a rectified input voltage V_IN that is rectified from an AC line voltage through a diode bridge 210 and smoothed by a bulk input capacitor C_BULK.

Controller 205 is configured to adjust the desired peak voltage according to the line ripple compensation technique disclosed herein to determine a compensated peak voltage to be used in the current switching cycle. After switching on power switch transistor S1 in a current cycle, controller 205 monitors the sense voltage across sense resistor R_Sense to determine when a compensated peak current (I_PK) through the primary winding has been achieved responsive to the sense voltage equaling the compensated peak voltage and then switches off power switch transistor S1 accordingly. The feedback voltage V_FB used by controller 205 with regard to calculating the desired peak voltage in PWM operation (or the desired switching period in PFM operation) may be derived using an optoisolator or through primary-only sensing techniques. For illustration brevity, the feedback voltage is shown being received directly from the output voltage V_OUT produced on a secondary side flyback converter 200 including an output diode D and an output capacitor C.

Figure 3:
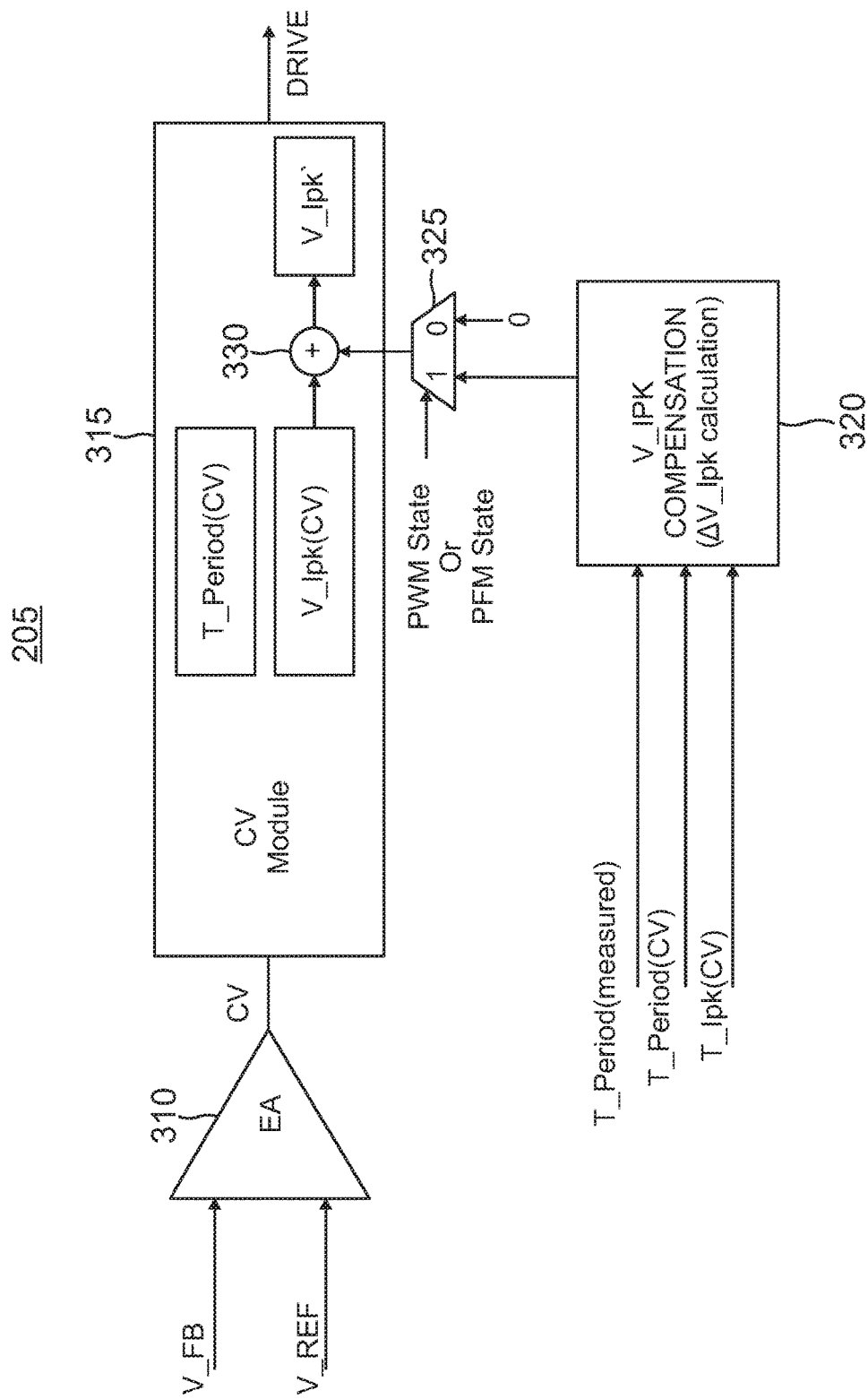
FIG. 3 is a more detailed block diagram of the controller in the flyback converter of FIG. 2 in accordance with an aspect of the disclosure.

Controller 200 is shown in more detail in FIG. 3. An error amplifier 310 produces an error signal responsive to the difference between the voltage feedback signal (V_FB) and a reference voltage (V_REF). The error signal is thus an analog signal whose amplitude depends upon the amplitude of the difference. In alternative embodiments, such voltage sensing may be performed in the digital domain by a comparator instead of an error amplifier. The error signal from error amplifier 210 is compensated through a compensation filter (not illustrated) to form a control voltage received by a constant voltage control circuit 315. As known in the controller arts, constant voltage control circuit 315 may receive an analog control voltage and process it in the analog domain or may receive a digital control voltage as produced by a digital voltage sensing circuit and process it in the digital domain. Regardless of the type of processing, constant voltage control circuit 315 will use the feedback to determine a desired peak voltage (V_Ipk(CV)) during pulse width modulation operation or will use the feedback to determine a desired switching period (T_Period(CV) during pulse frequency modulation operation. In pulse frequency modulation operation, the desired peak voltage V_Ipk(CV) is static whereas it is dynamic in pulse width modulation operation. Conversely, the desired switching period T_Period(CV) is static in pulse width modulation operation whereas it is dynamic in pulse frequency modulation operation.

Figure 1A:
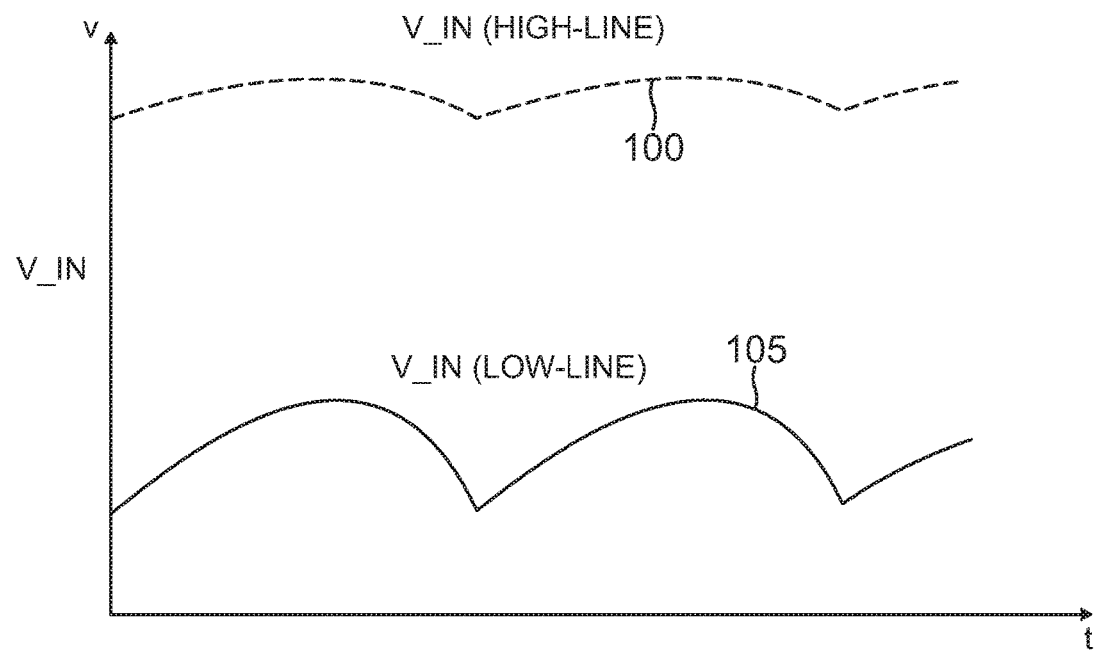
FIG. 1A illustrates the rectified input voltage waveforms resulting from the rectification of a relatively high AC voltage and a relatively low AC voltage.
Figure 1B:
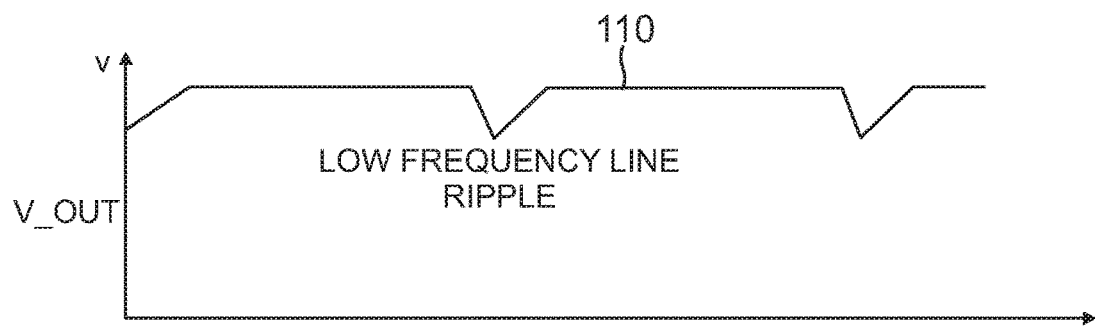
FIG. 1B illustrates the output voltage waveform of a conventional switching power converter operating under a heavy load as powered by the low rectified input voltage of FIG. 1A.

Regardless of the mode of operation, constant voltage control circuit 315 uses the desired peak voltage V_Ipk(CV) to control the power switch off time in the cycling of the power switch transistor. But merely using the desired peak voltage V_Ipk(CV) to control the power switch off time is subject to line ripple for low AC line voltage states such as discussed with regard to FIGS. 1A and 1B. Controller 205 thus includes a peak voltage compensation circuit 220 that is configured to determine a peak voltage adjustment factor (ΔV_Ipk) based upon the desired switching period T_Period (CV), the difference ΔTp between the actual switching period (T_Period(measured) in a preceding cycle of the power switch and the desired switching period T_Period (CV), and the desired peak voltage V_Ipk(CV) such as discussed with regard to equation (4).

There may be modes of operation besides the pulse width modulation mode and the pulse frequency modulation mode in which line ripple compensation is not used. Thus a multiplexer 325 can select for the peak voltage adjustment factor ΔV_Ipk or a zero depending upon if some mode of operation besides the pulse width modulation mode or the pulse frequency modulation mode is being used. In these other modes, multiplexer 325 may select for the zero value.

Conversely, multiplexer 325 is controlled to select for the peak voltage adjustment factor ΔV_Ipk during either pulse width modulation operation or pulse frequency modulation operation. An adder 330 adds the desired peak voltage V_Ipk(CV) with the peak voltage adjustment factor ΔV_Ipk to produce the compensated peak voltage (V_Ipk') that will be used in the current switching cycle.

Figure 4:
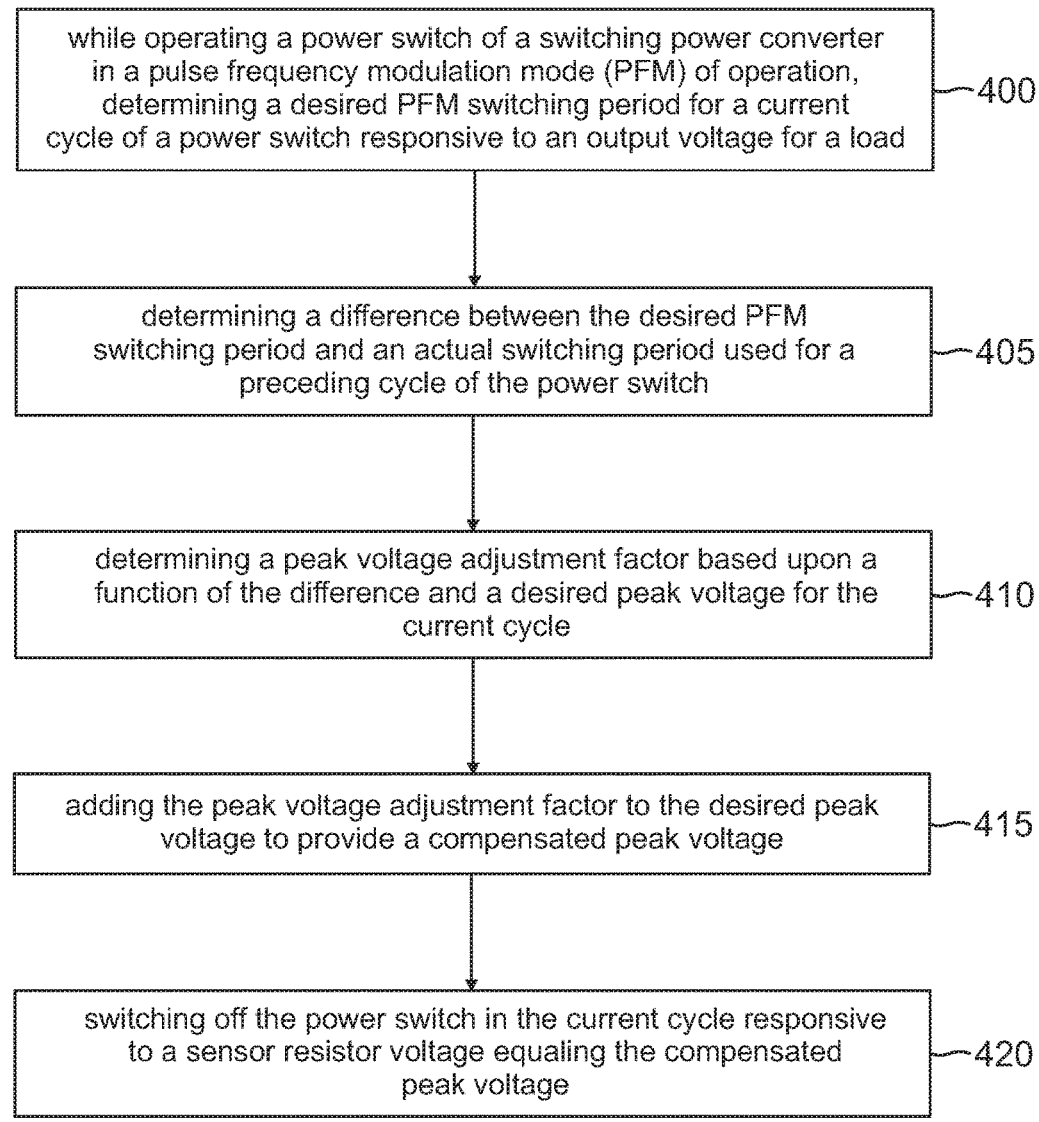
FIG. 4 is a flowchart for an example method of line ripple compensation during PFM operation in accordance with an aspect of the disclosure.

The resulting line ripple compensation is quite advantageous as the compensation is more robust than conventional line ripple compensation techniques that merely compensate the peak voltage based upon the difference between the desired switching period and the actual switching period. Moreover, the line ripple compensation disclosed herein is applicable to both pulse width modulation and pulse frequency modulation operation. These advantages may be better appreciated with reference to the example peak voltage adjustment method shown in the flowchart of FIG. 4. The method includes an act 400 of, while operating a power switch of a switching power converter in a pulse frequency modulation (PFM) mode of operation, determining a desired PFM switching period for a current cycle of a power switch responsive to an output voltage for a load. The determination of the desired period T_Period(CV) in constant voltage control circuit 315 responsive to the processing of the output voltage is an example of act 400. The method further includes an 405 of determining a difference between the desired PFM switching period and an actual switching period used for a preceding cycle of the power switch. The determination of ΔTp between the actual switching period T_Period(measured in a preceding cycle of the power switch and the desired switching period T_Period(CV) as discussed with regard to peak voltage compensation circuit 320 is an example of act 405. In addition, the method includes an act 410 of determining a peak voltage adjustment factor based upon a function of the difference, the desired PFM switching period, and a desired peak voltage for the current cycle. The calculation of the peak voltage adjustment factor ΔV_Ipk using equation (4) is an example of act 410. Moreover, the method includes an act 415 of adding the peak voltage adjustment factor to the desired peak voltage to provide a compensated peak voltage. The addition within adder 330 is an example of act 415. Finally, the method includes an act 420 of switching off the power switch in the current cycle responsive to a sense resistor voltage equaling the compensated peak voltage. The cycling off of power switch transistor S1 in FIG. 1 is an example of act 420.

As those of some skill in this art will by now appreciate and depending on the particular application at hand, many modifications, substitutions and variations can be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. A controller for a switching power converter, comprising:
 a peak voltage compensation circuit configured to determine a peak voltage adjustment factor responsive to a function of a difference between a desired switching period for a power switch and an actual switching period for the power switch, a desired peak voltage, and the desired switching period; and a constant voltage control circuit including an adder configured to add the desired peak voltage with the peak voltage adjustment factor to provide a compensated peak voltage, wherein the constant voltage control circuit is further configured to command the power switch to be cycled off in a current cycle of the power switch responsive to a sense voltage equaling the compensated peak voltage.

2. The controller of claim 1, wherein the constant voltage control circuit is further configured to adjust the desired switching period during a pulse frequency modulation (PFM) operation responsive to a feedback voltage from a load, and wherein the current cycle of the power switch is a PFM cycle.

3. The controller of claim 1, wherein the constant voltage control circuit is further configured to adjust the desired peak voltage during a pulse width modulation (PWM) operation responsive to a feedback voltage from a load, and wherein the current cycle of the power switch is a PWM cycle.

4. The controller of claim 1, wherein the function is a product of a proportionality constant with the difference and with a ratio of the desired peak voltage to the desired switching period.

5. The controller of claim 4, wherein the proportionality constant equals 0.5.

6. The controller of claim 1, wherein the controller is a flyback controller, and wherein the power switch is coupled to a primary winding of the flyback controller.

7. The controller of claim 2, wherein the constant voltage control circuit further includes an error amplifier configured to generate an error signal responsive to a difference between the feedback voltage and a reference voltage, wherein the constant voltage control circuit is further configured to adjust the desired switching period during the PFM operation responsive to the error signal.

8. The controller of claim 3, wherein the constant voltage control circuit further includes an error amplifier configured to generate an error signal responsive to a difference between the feedback voltage and a reference voltage, wherein the constant voltage control circuit is further configured to adjust the desired peak voltage during the PWM operation responsive to the error signal.

9. A method, comprising:
while operating a power switch of a switching power converter in a pulse frequency modulation (PFM) mode of operation, determining a desired PFM switching period for a current cycle of a power switch responsive to feedback voltage from a load;
determining a difference between the desired PFM switching period and an actual switching period used for a preceding cycle of the power switch;
determining a peak voltage adjustment factor based upon a function of the difference, a desired peak voltage, and the desired PFM switching period;
adding the peak voltage adjustment factor to the desired peak voltage to provide a compensated peak voltage; and
switching off the power switch in the current cycle responsive to a sense resistor voltage equaling the compensated peak voltage.

10. The method of claim 9, wherein the desired peak voltage is static during the pulse frequency modulation mode of operation.

11. The method of claim 9, wherein determining the peak voltage adjustment factor is based upon a product of the difference with a proportionality constant and with a ratio of the desired peak voltage to the desired switching period.

12. The method of claim 11, wherein the proportionality constant is 0.5.

13. The method of claim 9, wherein switching off the power switch comprises switching off a power switch in a flyback converter.

14. The method of claim 9, wherein the load is a battery.

15. A method, comprising:
while operating a power switch of a switching power converter in a pulse width modulation (PWM) mode of operation, determining a desired peak voltage for a current cycle of a power switch responsive to a feedback voltage from a load;
determining a difference between a desired switching period for the power switch and an actual switching period used for a preceding cycle of the power switch;
determining a peak voltage adjustment factor based upon a function of the difference, the desired peak voltage, and the desired switching period;
adding the peak voltage adjustment factor to the desired peak voltage to provide a compensated peak voltage; and
switching off the power switch in the current cycle responsive to a sense resistor voltage equaling the compensated peak voltage.

16. The method of claim 15, wherein the desired switching period is static during the pulse width modulation mode of operation.

17. The method of claim 15, wherein determining the peak voltage adjustment factor is based upon a product of the difference with a proportionality constant and with a ratio of the desired peak voltage to the desired switching period.

18. The method of claim 17, wherein the proportionality constant is 0.5.

* * * * *